United States Patent
Lynch

[19]

[11] Patent Number: 6,164,840
[45] Date of Patent: Dec. 26, 2000

[54] ENSURING CONSISTENCY OF AN INSTRUCTION CACHE WITH A STORE CACHE CHECK AND AN EXECUTION BLOCKING FLUSH INSTRUCTION IN AN INSTRUCTION QUEUE

[75] Inventor: William L. Lynch, La Honda, Calif.

[73] Assignee: Sun Microsystems, Inc., Palo Alto, Calif.

[21] Appl. No.: 08/881,106

[22] Filed: Jun. 24, 1997

[51] Int. Cl.[7] ........................................... G06F 9/38
[52] U.S. Cl. ..................... 395/383; 395/567; 711/125; 711/141; 711/145
[58] Field of Search ........................ 395/383, 567; 711/125, 141, 145

[56] References Cited

U.S. PATENT DOCUMENTS

| | | |
|---|---|---|
| 5,377,336 | 12/1994 | Eickemeyer et al. . |
| 5,551,001 | 8/1996 | Cohen et al. . |
| 5,625,787 | 4/1997 | Mahin et al. . |
| 5,644,752 | 7/1997 | Cohen et al. ............................ 711/122 |
| 5,649,137 | 7/1997 | Favor et al. ............................ 395/383 |
| 5,692,167 | 11/1997 | Grochowski et al. .................. 395/567 |
| 5,740,398 | 4/1998 | Quattromani et al. . |
| 5,742,791 | 4/1998 | Mahalingaiah et al. ................ 711/146 |

*Primary Examiner*—Kenneth S. Kim
*Attorney, Agent, or Firm*—Jones, Volentine, Steinberg & Whitt, LLP

[57] ABSTRACT

A method of ensuring instruction cache consistency in a processor includes executing a flush instruction whenever a program executed by the processor stores data to a given data address and, subsequently, executes another instruction requiring a data fetch from the same address. According to this method, a write cache prevents any addressed instruction from residing in the write cache and the instruction cache at the same time. Thus, when an instruction having a store address not already present in the write cache is retired to the write cache, the write cache instructs the instruction cache to invalidate any data stored therein having a same address. The flush instruction prevents execution of any other instructions after the store at least until the store to the memory address has been allocated to a write cache of the processor, thus enabling the write cache to invalidate the subsequent instruction at the same address in the instruction cache. The method insures instruction cache consistency without the need to check every store against the instruction cache.

16 Claims, 5 Drawing Sheets

ENSURING CONSISTENCY OF AN
INSTRUCTION CACHE WITH A STORE
CACHE CHECK AND AN EXECUTION
BLOCKING FLUSH INSTRUCTION IN AN
INSTRUCTION QUEUE

BACKGROUND OF THE INVENTION

1. Field of the Invention

The present invention generally relates to processor architectures, and more particularly, the present invention relates to a method for ensuring the consistency of an instruction cache of a microprocessor.

2. Description of the Related Art

As shown in FIG. 1, many current RISC processor configurations are implemented by an instruction cache (i-cache) 102 interposed between a main memory 104 and an execution unit 108. The i-cache 102 receives instructions from the main memory 104 and temporarily stores the instructions which are to be executed by the execution unit 108. Typically, the i-cache 102 is a primary level cache in the sense that a slower secondary level external cache (e-cache) 106 is located between the main memory 104 and the i-cache 102. Both writes (stores) to and reads (fetches) from the main memory 104 must occur through the e-cache 106. Additionally, prefetching schemes are employed whereby the next instructions are fetched from the i-cache 102 into an instruction queue 110 before the current instruction is complete.

Instruction "consistency" of the data contained in the i-cache is a concept related to the case where a prior store instruction is to an address of a subsequent instruction already loaded into the i-cache. Suppose, for example, the i-cache 102 is configured to hold 256 lines (instructions) of data at a time. Suppose further that instructions 60 and 130 of the program sequence may be characterized as follows:

| . | |
| --- | --- |
| . | |
| . | |
| 60. | Store instruction X at address A |
| . | |
| . | |
| . | |
| 130. | Execute instruction at address A |
| . | |
| . | |
| . | |

When instruction 60 is executed, the processor will access the main memory 104 to update the data at address A with instruction X. However, since the prior data at address A has already been loaded into the i-cache 102, this new data (instruction X) will not execute unless the i-cache 102 is updated as well.

When the program does a store of operand data, a sophisticated mechanism is adopted that maintains data consistency to ensure that what was just stored is loaded during a subsequent load of the same data. This technique is generally not applied to the i-cache because the mechanism is complicated and expensive, and since it's fairly rare that a program actually does a store into an instruction stream that is going to be used as an instruction to execute the program.

If an instruction is to be stored at a specific address which is already sitting in the i-cache, then eventually whatever was stored needs to appear as the instruction at that address when executed. Nevertheless, it is preferable not to have in place a complex and expensive mechanism for making sure that instantly the new data becomes visible in the i-cache for every store on every processor in a multiprocessor system, particularly for handling something that occurs so rarely.

Many conventional systems use a so-called "flush instruction" to ensure i-cache consistency. That is, while some processors check each store against the i-cache, most RISC processors do not have a special mechanism for carrying out this check, and instead these processors have special instructions which cause this check to happen. After the program executes a store, it's then required to do a flush instruction at that address before it can know for sure that the instruction will be seen in its instruction stream. The "flush instruction" goes out on the multiprocessor bus as an exclusive request. As such, the software must know that it is storing to the instruction stream, and is required to execute a flush instruction before the hardware absolutely guarantees that this store will be visible.

These machines experience a problem if the process migrates in that the flush instruction needs to propagate to the interconnect because it is unknown if the process migrated between the store and the flush. In a multiprocessor system, all other processors have their i-cache consistent, just not the one doing the storing.

The conventional techniques thus suffer the drawbacks of being complex and expensive, requiring high bandwidth implementation and/or exhibiting migration related problems.

SUMMARY OF THE INVENTION

It is thus an object of the present invention to overcome or at least minimize the various drawbacks associated with conventional techniques for ensuring consistency of an instruction cache.

It is further an object of the present invention to provide a mechanism for achieving instruction cache consistency that is relatively inexpensive and lacking in complexity.

It is another object of the present invention to provide a mechanism for achieving instruction cache consistency that requires much less bandwidth than is needed when checking every store against the instruction cache.

It is yet another object of the present invention to provide a mechanism for achieving instruction cache consistency which avoids the problem of migration.

According to one aspect of the present invention, a processor-implemented method is provided for ensuring consistency of data contained in a instruction cache, the method including: invalidating in the instruction cache any data of a first memory address which is present in the instruction cache each time a store to the same first memory address is allocated to a write cache; invalidating in the write cache any data of a second memory address which is present in the write cache each time a fetch from the same second memory address is sent to the instruction cache; and executing a flush instruction at least in a case where a program includes a store to a third memory address and then an execution of another instruction of the same third memory address, the flush instruction being executed between the store and the execution of the other instruction, and preventing fetching from the instruction cache of any instructions subsequent to the flush instruction at least until the store to the third memory address has been allocated to the write cache.

According to another aspect of the invention, the flush instruction is fetched to a front of an instruction queue and remains at the front of the instruction queue until a store queue is cleared of all stores, wherein the store queue allocates the stores to the write-cache.

According to yet another aspect of the invention, the method further includes signaling the instruction cache from the write cache upon the allocation of each store into the write cache, wherein the instruction cache is responsive to the signaling to invalidate any data stored therein having a memory address corresponding to that of each store.

According to still another aspect of the invention, the method further includes signaling the write cache from an external cache upon each request for data from the instruction cache, wherein the write cache is responsive to the signaling to transmit to the external cache any data stored therein having a memory address corresponding to that of the data of each request, and to then invalidate the data stored therein having a memory address corresponding to that of the data of each request.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENTS

The present invention employs a special instruction (called a flush instruction herein) in such a manner that there is no requirement to update the instruction cache every time a store is executed to cover the potentiality of the store being directed at an instruction already addressed in the i-cache. The invention ensures that any execution of a store will in fact update the local processor i-cache at some point in the near future. The flush instruction of the invention (unlike that of conventional systems) functions to effectively cause the loading of instructions to wait for a length of time, and only then is the instruction loaded after it is fetched from the i-cache.

A queue of instructions is positioned between the i-cache and the execution units. When the flush instruction gets fetched, it comes down and goes to the front of the queue where it waits until there is assurance that any stores have been kept consistent in the i-cache. During this time, instructions pile up behind the flush instruction in the queue, but once the flush instruction is complete, the queue is clear and instructions are fetched from the i-cache. Clearing of the instruction queue (behind the flush instruction) is needed because the invention does not function to guarantee that instructions fetched into the queue are kept consistent. Only instructions of the i-cache are kept consistent. In this sense, the flush instruction does not directly function to make the i-cache data consistent. Instead, the flush instruction causes the program to wait the necessary amount to time to guarantee that the other mechanisms have finished their jobs and the i-cache is at that point consistent.

Stores are allocated to a write cache. Consistency is achieved by making sure that any stores update instructions that might be in the i-cache. The present invention adopts an approach whereby, logically speaking, a line (instruction) is not permitted to reside in the w-cache and the i-cache at the same time. Thus, if a store is retiring, it is in the write cache and can not be in the i-cache as well. The i-cache has essentially been "updated", because there is a guarantee that the store does not reside in the i-cache. In other words, when storing to the write cache, the mechanism ensures that the store does not reside in the i-cache, and thus the i-cache must at that point be devoid of stale instructions.

Figure 1:
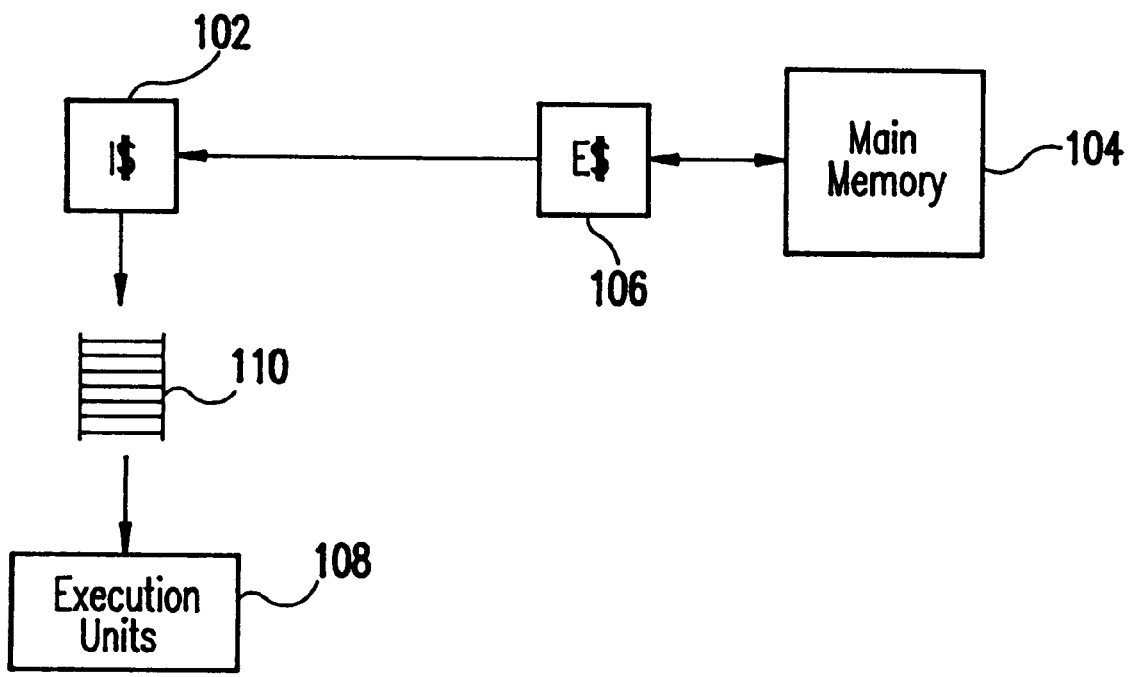
FIG. 1 is a block diagram of conventional components of a processor configuration for applying instructions from a main memory to execution units of the processor.
Figure 2:
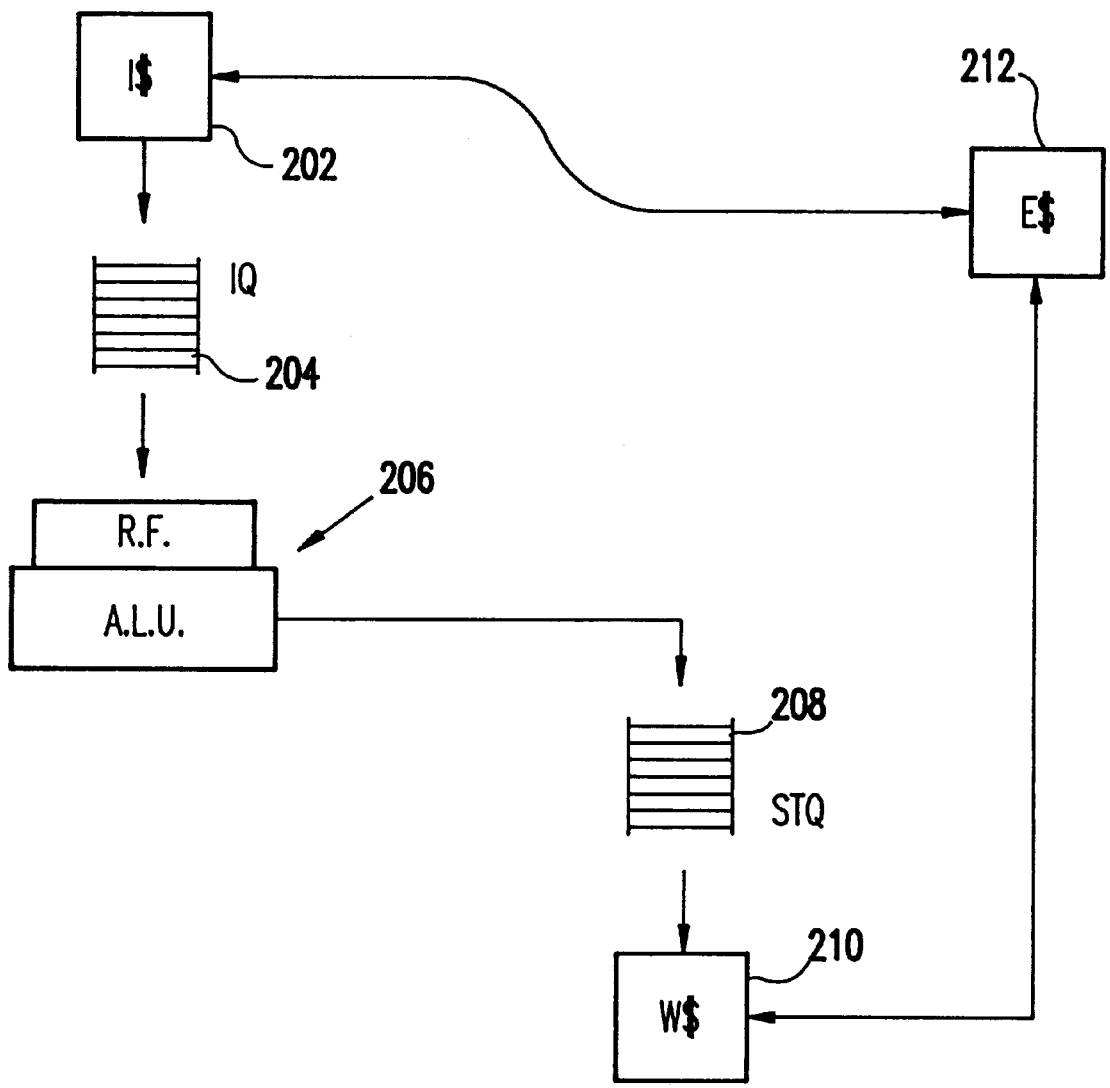
FIG. 2 is a block diagram of components of a processor configuration of the present invention for ensuring consistency of an instruction cache of the processor.

An exemplary implementation of an embodiment of the invention will now be described with reference to FIGS. 2–5. FIG. 2 is a block diagram of the basic component parts of the embodiment, and FIGS. 3–5 are operational flow charts of the embodiment.

Referring first to FIG. 2, reference numeral 202 is an instruction cache (i-cache) functionally positioned at the front end of the processor configuration for storing instructions of the program to be executed which are stored in a main memory (not shown). The instructions are prefetched into an instruction queue 204. After passing through the instruction queue 204, the instructions are applied to execution units 206 (including, for example, register files R.F. and arithmetic logic units ALU) for execution.

In the case of store instructions, the data to be stored are loaded into a store queue (STQ) 208, and from the store queue 208, the data is retired to a write cache (w-cache) 210 which prestores data to be written into the main memory. Reference numeral 212 is an external cache (e-cache) interposed between the various on-chip caches of the processor and the main memory. Both writes (stores) to and reads (fetches) from the main memory must occur through the e-cache 212.

Figure 3:
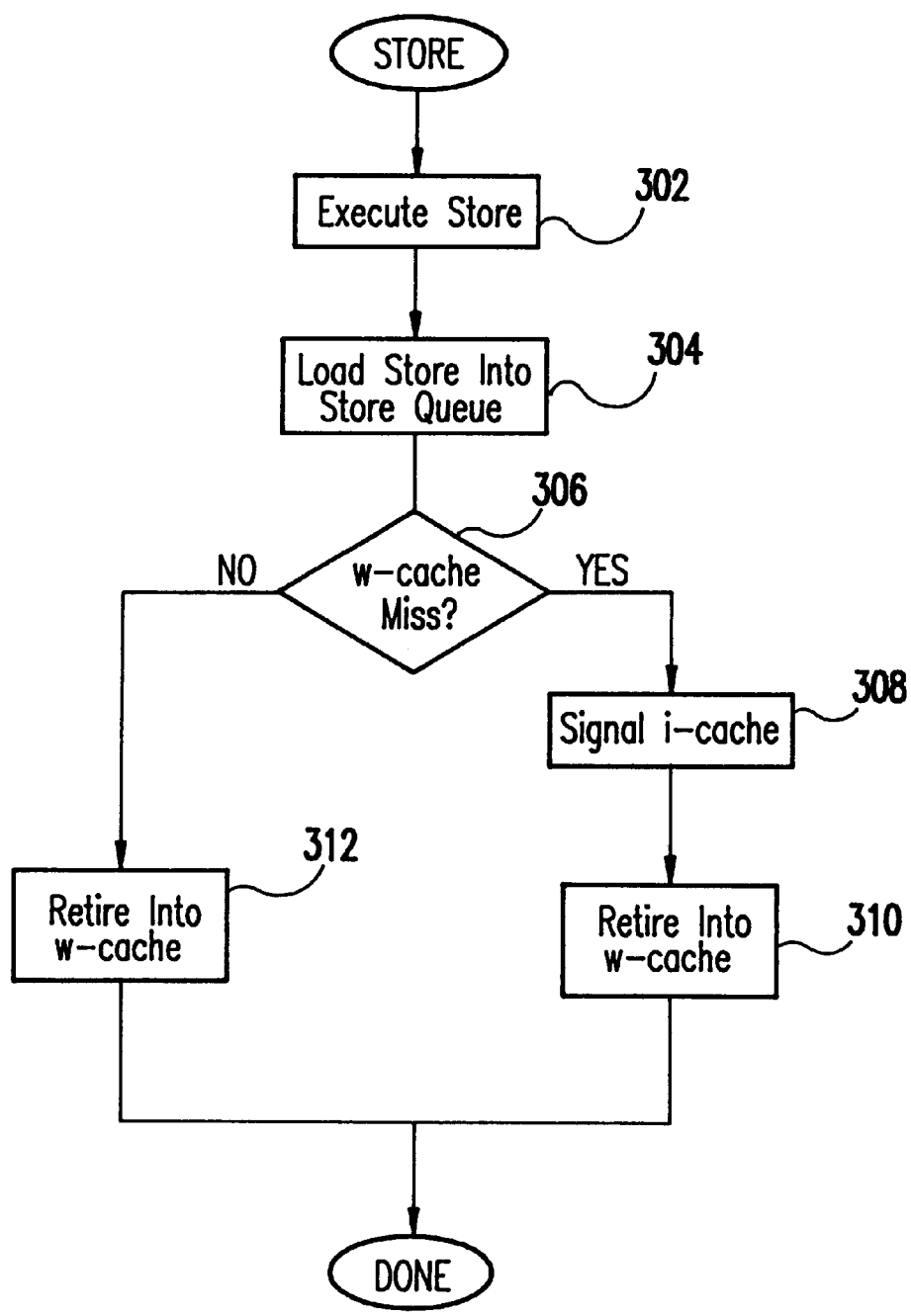
FIG. 3 is a process flow chart of the mechanism of the invention for ensuring consistency of an instruction cache of the processor during execution of a store into main memory.
Figure 4:
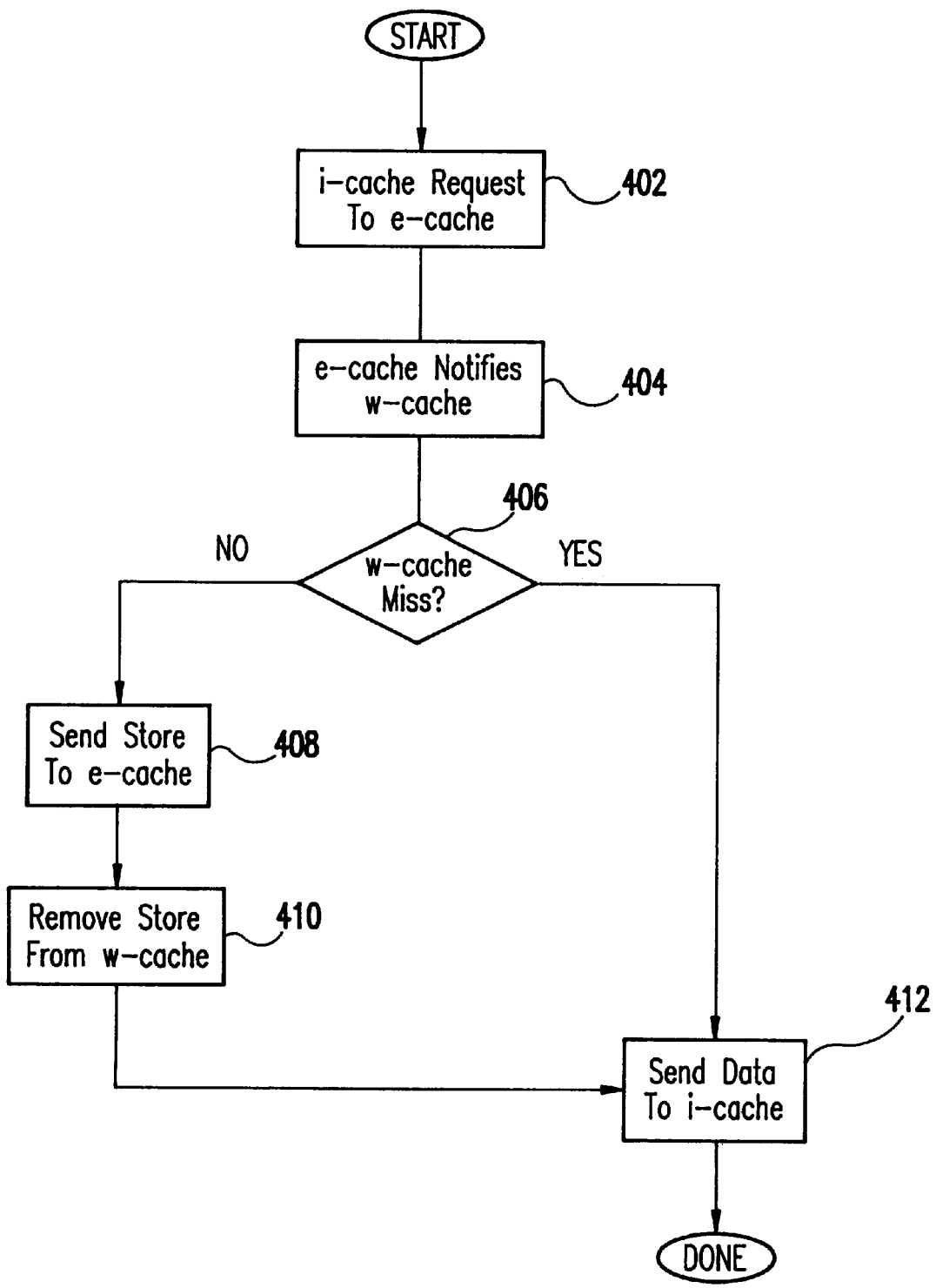
FIG. 4 is a process flow chart of the mechanism of the invention for ensuring consistency of an instruction cache of the processor during execution of a fetch from main memory.
Figure 5:
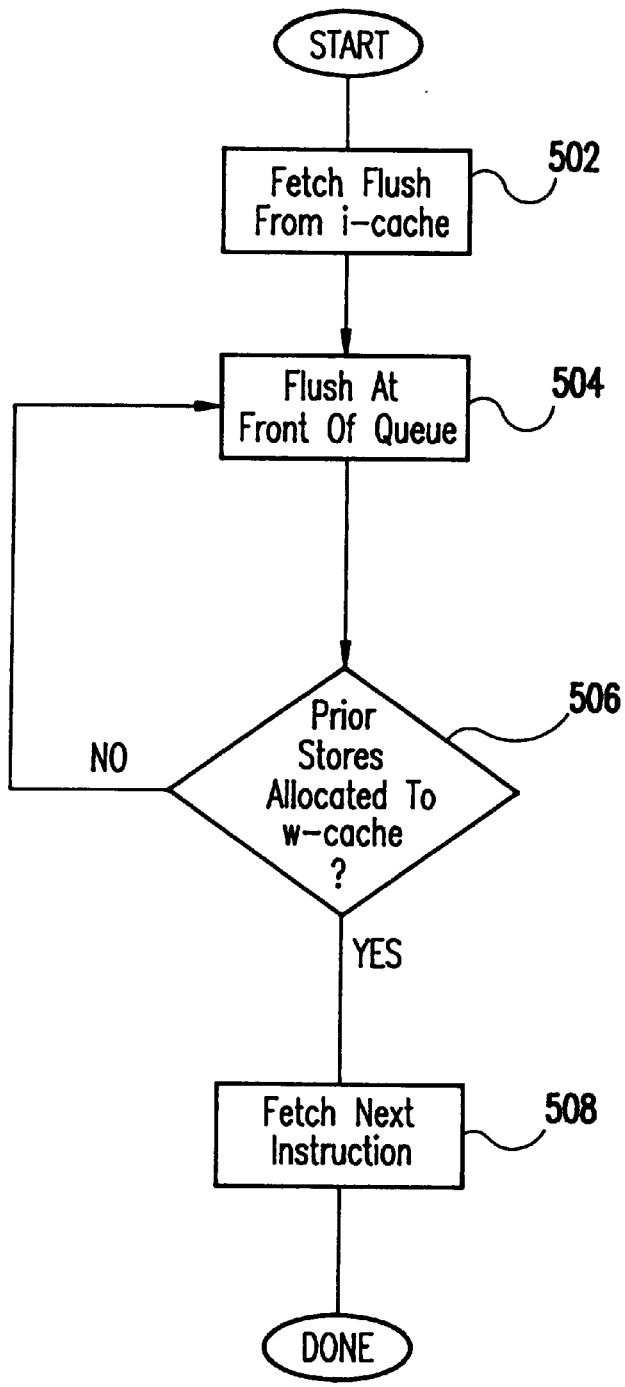
FIG. 5 is a process flow chart of the mechanism of the invention for ensuring consistency of an instruction cache of the processor during execution of a flush instruction.

Referring now to FIGS. 3 and 4, as well as FIG. 2, the mechanism of the invention for maintaining consistency of the instructions contained in the i-cache will now be described. As will be apparent, this aspect of the mechanism functions to ensure that an addressed instruction is never present at the same time in both the w-cache 210 and the i-cache 202. FIG. 3 is directed to the storing of data into the main memory, and FIG. 4 is directed to the fetching of data from the main memory.

Assume, for example, the same two instructions in the program sequence noted previously, namely:

| | |
|---|---|
| . | |
| . | |
| . | |
| 60. | Store instruction X at address A of main memory |
| . | |
| . | |
| . | |
| 130. | Execute instruction at address A of main memory |
| . | |
| . | |
| . | |

As shown by steps 302 and 304 of FIG. 3, the store instruction 60 is executed in the normal manner. That is, the store is fetched into the instruction queue 204, is applied to the execution unit 206, and is loaded into the store queue 208.

Then, when the store is otherwise ready for retirement in the w-cache 210, the mechanism looks into the w-cache 210 at step 306 to see if the store address is present in the w-cache 210. In the present example, since address A is residing in the i-cache 202 (instruction 130), the store address can not be present in the w-cache 210 as well. Thus, there is a w-cache miss at step 306, and the process proceeds to step 308. At step 308, the w-cache 210 signals the i-cache 202 to invalidate the data associated with address A. In other words, when the w-cache 210 allocates the store, it instructs the i-cache 202 do delete the same if present in the i-cache 202. At the same time, although not shown in FIG. 3, the w-cache 210 requests permission to write to the e-cache 212. Next, at step 310, the store is retired into the w-cache 210 with the assurance that the same address is not present in the i-cache 202.

In the case where the store address is present in the w-cache 210 (NO at step 306), the store may be retired into the w-cache 210 without regard to the i-cache 202. The presence of the store address in the w-cache 210 must mean that the same address is not also present in the i-cache 202. Thus, there is no need to signal the i-cache 202 as in the case of a w-cache miss at step 306.

Reference is now made to FIG. 4 for a description of a fetch from main memory of an instruction to be stored in the i-cache 202. It is assumed below that the instruction at address A is to be fetched into the i-cache 202.

A program counter (not shown) instructs the i-cache 202 to fetch address A, and since the i-cache 202 does not already contain address A, it issues a request at step 402 to the e-cache 212 for the data at address A. The e-cache 212 then notifies the w-cache 210 at step 404 that the i-cache 202 is requesting the data at address A.

In the case where address A is present in the w-cache 210 (NO at step 406), the corresponding store is forwarded to the e-cache 212, together with any other stores, at step 408. The data is then logically removed from w-cache at step 410. Then, at step 412, the newly stored data of address A is sent to the i-cache 202 from the e-cache 212 with the assurance that the same address is not present in the w-cache 210 as well.

In the case where address A is not present in the w-cache 210 (YES at step 406), the e-cache 212 simply sends the data of address A to the i-cache 202 in the normal manner. Again, address A is present in the i-cache 202 and not the w-cache 210.

Thus, according to the processes of FIGS. 3 and 4, when one of the i-cache 202 or the w-cache 210 requests an address, the other at least logically removes the same. In this manner, the same address can never appear in both the i-cache 202 or the w-cache 210 at the same time.

In the case where there is a store to address A and then execution of the instruction at address A, the program is required to insert and execute a flush instruction between the store and subsequent execution. The reason for this is that, at the time of the retirement of the store into the w-cache 210, the stale instruction of the same address may have already been fetched into the i-queue 204. Note the signal to the i-cache 202 at step 308 of FIG. 3 results in the address being removed from the i-cache 202 only, and not from the i-queue 204. Thus, if the address has already made its way to the i-queue 202, the instruction will not have been updated by operation of the process of FIGS. 3 and 4.

The flush instruction of the invention will now be described with reference to FIG. 5. The flush instruction is fetched from the i-cache 202 at step 502 and placed at the front of the i-queue 204 at step 504. Then, by operation of step 506, the flush instruction sits at the top of the i-queue 202, preventing any further fetches into the queue 204 from the i-cache 202, at least until the store of concern gets to the store queue 208 and is allocated to the w-cache 210 (step 312 or step 310 of FIG. 3). For all practicable purposes, the program waits until all the stores in front of the flush have been allocated to the w-cache 310, and thus it waits until the store queue 208 is empty. At that point, the next instruction is fetched into the i-queue 204 at step 508. That program then knows that all the store data has been invalidated out of the i-cache because, by operation of the process of FIG. 3, the stores cannot be retired into the w-cache 210 until they have been invalidated from the i-cache 202.

Therefore, the flush instruction effectively functions to synchronize the pipeline by delaying the fetch of all subsequent instructions until such time that all prior stores have reached the write cache at which point the mechanism guarantees that same addresses are not also present in the i-cache, and thus, the data of the i-cache 202 is consistent (or is not inconsistent) with that of the w-cache 210.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as failing within the scope of the invention.

What is claimed is:

1. A processor-implemented method for ensuring cache-consistency of data contained in an instruction cache of a processor wherein said instruction cache receives from a main memory by means of an external cache, data for processing by said processor and wherein a write cache stores data from the processor, by means of the external cache, to the main memory said method comprising:

invalidating in the instruction cache any data of a first memory address of the main memory which is present in the instruction cache each time a store to the same first memory address is allocated to the write cache;

storing in the external cache and then invalidating in the write cache any data of a second memory address of the main memory which is present in the write cache each time a fetch from the same second memory address is sent to the instruction cache; and executing a flush instruction at least in a case where the instruction cache includes a store to a third memory address of the main memory and then an execution of another instruction of the same third memory address, the flush instruction being executed between the store and the execution of the other instruction, and preventing fetching from the instruction cache of any instructions subsequent to the flush instruction at least until the store to the third memory address has been allocated to the write cache.

2. A processor implemented method as claimed in claim 1, wherein the flush instruction is fetched to a front of an instruction queue interposed between said instruction cache and an execution unit of said processor and remains at the front of the instruction queue until a store queue interposed between said execution unit and said write cache is cleared of all stores, wherein the store queue allocates stores to the write cache.

3. A computer implemented method as claimed in claim 1, further comprising signaling the instruction cache from the write cache upon the allocation of each store into the write cache, wherein the instruction cache is responsive to the signaling to invalidate any data stored therein having a memory address corresponding to that of each store.

4. A computer implemented method as claimed in claim 2, further comprising signaling the instruction cache from the write cache upon the allocation of each store into the write cache, wherein the instruction cache is responsive to the signaling to invalidate any data stored therein having a memory address corresponding to that of each store.

5. A computer implemented method as claimed in claim 1, further comprising signaling the write cache from the external cache upon each request for data from the instruction cache, wherein the write cache is responsive to the signaling to transmit to the external cache any data stored therein having a memory address corresponding to that of the data of each request, and to then invalidate the data stored therein having a memory address corresponding to that of the data of each request.

6. A computer implemented method as claimed in claim 2, further comprising signaling the write cache from the external cache upon each request for data from the instruction cache, wherein the write cache is responsive to the signaling to transmit to the external cache any data stored therein having a memory address corresponding to that of the data of each request, and to then invalidate the data stored therein having a memory address corresponding to that of the data of each request.

7. A computer implemented method as claimed in claim 3, further comprising signaling the write cache from the external cache upon each request for data from the instruction cache, wherein the write cache is responsive to the signaling to transmit to the external cache any data stored therein having a memory address corresponding to that of the data of each request, and to then invalidate the data stored therein having a memory address corresponding to that of the data of each request.

8. A computer implemented method as claimed in claim 4, further comprising signaling the write cache from the external cache upon each request for data from the instruction cache, wherein the write cache is responsive to the signaling to transmit to the external cache any data stored therein having a memory address corresponding to that of the data of each request, and to then invalidate the data stored therein having a memory address corresponding to that of the data of each request.

9. A computer implemented method as claimed in claim 1, wherein all instructions behind the flush instruction contained in an instruction queue interposed between said instruction cache and an execution unit of said processor are invalidated.

10. A computer implemented method as claimed in claim 3, wherein all instructions behind the flush instruction contained in an instruction queue interposed between said instruction cache and an execution unit of said processor are invalidated.

11. A computer implemented method as claimed in claim 5, wherein all instructions behind the flush instruction contained in an instruction queue interposed between said instruction cache and an execution unit of said processor are invalidated.

12. A computer implemented method as claimed in claim 2, wherein all instructions contained in the instruction queue behind the flush instruction are invalidated.

13. A computer implemented method as claimed in claim 4, wherein all instructions contained in the instruction queue behind the flush instruction are invalidated.

14. A computer implemented method as claimed in claim 6, wherein all instructions contained in the instruction queue behind the flush instruction are invalidated.

15. A computer implemented method as claimed in claim 7, wherein all instructions contained in an instruction queue behind the flush instruction are invalidated.

16. A computer implemented method as claimed in claim 8, wherein all instructions contained in the instruction queue behind the flush instruction are invalidated.

* * * * *